(12) United States Patent
Wigder et al.

(10) Patent No.: US 10,410,239 B2
(45) Date of Patent: *Sep. 10, 2019

(54) CONTENT PRESENTATION BASED ON USER INTERACTION IN A FLIP-BASED DIGITAL MAGAZINE ENVIRONMENT

(71) Applicant: Flipboard, Inc., Palo Alto, CA (US)

(72) Inventors: David Wigder, Bronx, NY (US); Yuru Zheng, New York City, NY (US)

(73) Assignee: Flipboard, Inc., Redwood City, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 15/482,645

(22) Filed: Apr. 7, 2017

(65) Prior Publication Data

US 2017/0300457 A1    Oct. 19, 2017

Related U.S. Application Data

(60) Provisional application No. 62/323,457, filed on Apr. 15, 2016.

(51) Int. Cl.
| | | |
|---|---|---|
| *G06F 3/048* | (2013.01) | |
| *G06Q 30/02* | (2012.01) | |
| *G06F 3/0483* | (2013.01) | |
| *H04L 29/08* | (2006.01) | |
| *G06F 3/0488* | (2013.01) | |
| *G06F 17/24* | (2006.01) | |

(52) U.S. Cl.
CPC ....... *G06Q 30/0241* (2013.01); *G06F 3/0483* (2013.01); *G06F 3/0488* (2013.01); *G06F 17/248* (2013.01); *H04L 67/10* (2013.01)

(58) Field of Classification Search
CPC . G06Q 30/0241; G06F 3/0483; G06F 3/0481; G06F 3/00; G06F 17/00; G06F 17/21
See application file for complete search history.

(56) References Cited

U.S. PATENT DOCUMENTS

| | | | |
|---|---|---|---|
| 6,441,811 B1 | 8/2002 | Sawada et al. | |
| 10,086,636 B1 | 10/2018 | Diaz et al. | |
| 2008/0120670 A1* | 5/2008 | Easton | H04N 7/173 725/115 |
| 2012/0105464 A1 | 5/2012 | Franceus | |
| 2012/0154372 A1 | 6/2012 | Buck et al. | |
| 2014/0164593 A1 | 6/2014 | Murray et al. | |
| 2014/0215341 A1 | 7/2014 | Fratti et al. | |
| 2014/0258833 A1* | 9/2014 | Hamilton, II | G06F 17/22 715/234 |
| 2014/0258839 A1 | 9/2014 | Hamilton et al. | |

(Continued)

*Primary Examiner* — Haoshian Shih
(74) *Attorney, Agent, or Firm* — Fenwick & West LLP

(57) ABSTRACT

A digital magazine presents content items based on user interaction with or preference for content items determined based on how a user flips through different content items of the digital magazine. For example, the user may slow down or pause flipping, flip through content items at an inconsistent pace or change the navigational direction of the flipping, when the user is encountered with content items of interest. By analyzing how a user flips through different content items, content items that the user interacts with can be determined, and content items that the user may interact with or prefer can be determined and presented to the user.

18 Claims, 16 Drawing Sheets

(56) References Cited

U.S. PATENT DOCUMENTS

| | | |
|---|---|---|
| 2014/0289834 A1 | 9/2014 | Lindemann |
| 2014/0380247 A1* | 12/2014 | Tecarro ................ G06F 3/0483 |
| | | 715/863 |
| 2015/0082136 A1 | 3/2015 | Cameron et al. |
| 2015/0370331 A1 | 12/2015 | Gonzales |
| 2016/0034429 A1 | 2/2016 | Wu et al. |
| 2016/0048537 A1* | 2/2016 | Epstein ................ H04L 67/306 |
| | | 705/26.7 |
| 2016/0142773 A1 | 5/2016 | Terui |

* cited by examiner

CONTENT PRESENTATION BASED ON USER INTERACTION IN A FLIP-BASED DIGITAL MAGAZINE ENVIRONMENT

CROSS-REFERENCE TO RELATED APPLICATION

This application claims the benefit of U.S. Provisional Application No. 62/323,457, entitled "Serving Ads Based on User Interaction In A Flip-Based Digital Magazine Environment," filed Apr. 15, 2016, which is incorporated by reference herein in its entirety.

BACKGROUND

This disclosure relates generally to digital magazines, and more particularly to selectively presenting content items based on user interaction in a flip-based digital magazine environment.

Digital distribution channels disseminate a wide variety of digital content including text, images, audio, links, videos, and interactive media (e.g., games, collaborative content) to users. Recent development of mobile computing devices such as personal computers, smart phones, tablets, etc., enables users to access numerous content items in various forms, and provide feedback for the content items.

Due to the proliferation of content in an electronic magazine, a user can be inundated with vast amount of information from various sources. Direct interactions by users with content items (e.g., clicking, sharing or endorsing content) can be used to indicate content preferences of users. However, such direct user interactions include only a small fraction of the interactions that users have with content items. Often the vast majority of interactions may be users browsing content items. Yet, it is hard to discern whether browsing a content item constitutes intentional user interaction with that content item. Based on limited information about user interactions, it is difficult for content providers to gauge which content items provided to existing digital magazines that users actually prefer. Moreover, it is also difficult for content providers to gauge which content formats or content topics the users actually prefer. As a result, sources of content items have limited or incomplete ways for identifying contents items, content formats, and content topics associated with content items that may be of interests to a particular user and providing a digital magazine catered to the user.

Consequently, content providers of existing digital magazines do not have a comprehensive understanding of what content items a user prefers.

SUMMARY

A computer-implemented method is disclosed for presenting content items in a digital magazine. The method includes obtaining information describing attributes of a user flipping a page of the digital magazine including one or more content items. According to the attributes of the user flipping a page of the digital magazine, a user preference for the content items or topics is determined. Moreover, preferred content items of the user may be predicted based on the user preference, preferences of other users, or a combination of them. Page information describing another page including one or more of the predicted content items may be generated, and the other page can be presented according to the page information.

In one embodiment, a user interaction with a content item is determined based on attributes of flipping of a page including the content item. Examples of attributes of flipping include timing of flips, an interval between flips, a direction of a flip, etc. The user interaction indicates a degree of engagement of the user with the content item. Examples of the user interaction include "change in navigational direction," "inconsistent pace of flipping," "active slowdown or pausing in between flips," "extended first half of page flip time," etc. Based on the determined user interaction, whether the user intentionally engaged with the content item can be determined.

In one embodiment, a user preference of a user is determined based on user interactions of flipping a page or pages associated with content items and meta tag associated with the content items. In one aspect, a content item may include content types (e.g., text, audio, images, video) and content elements (e.g., headlines, top copy, body text) that are associated with one or more meta tags. Each meta tag describes one or more topics (i.e., what the content items and content elements are related to) or other attributes that characterize the content type or content element. By analyzing the relationship between user interactions with the content items, meta tags associated with the content items and specific content types and content elements, topics of interest for the user may be determined. Moreover, an interest profile including a list of topics of interest may be generated. The interest profile of the user may indicate the user preference.

In one embodiment, a non-transitory computer-readable storage medium storing executable computer program instructions is disclosed. The non-transitory computer-readable storage medium stores executable computer program instructions for obtaining information describing attributes of a user flipping a page of the digital magazine, the page including one or more content items, determining a user preference for the content items based on the attributes of the user flipping the page, predicting preferred content items of the user based on the user preference, and generating page information describing another page including one or more of the predicted content items, as disclosed herein.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

Figure 1:
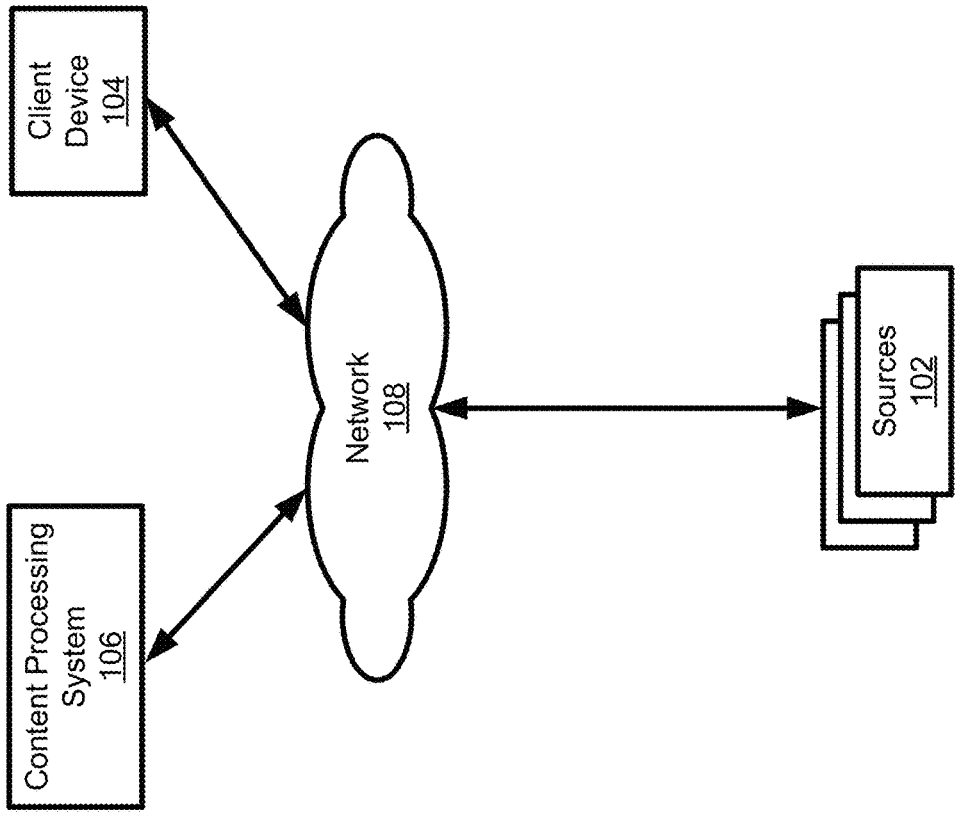
FIG. 1 is a block diagram of a system environment in which a content processing system operates, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

In one or more embodiments, content items are presented in a digital magazine according to a user preference of content items or topics determined based on how a user flips through different content items of the digital magazine. By analyzing how a user flips through a content item, a preference for or interest in the content item can be specified. For example, a user may flip through content items in a direction at a relatively consistent pace such that the time to flip is the same as the time in between flips. When pacing is consistent, it is uncertain that the user interacts with content items. However, the user may slow down or pause between flips, flip through content items at an inconsistent pace, navigate in a different direction, or slow down or pause during the subsequent flip in order to extend the time a content item is in-view, when the user is encountered with preferred or interesting content items. Moreover, content items that may be preferred by the user can be predicted based on user interactions with similar content items or content items associated with similar meta tags that describe the content item (e.g., format, topic etc.), and the predicted content items can be presented to the user. In addition, a content provider of the content item can determine viewability of the content item based on user interaction with that content item. Viewability of a content item is herein referred to an indication of whether the content item is deemed viewable. In one embodiment, a content item is considered viewable if a user intentionally interacts with the content item, regardless of the amount of time the content item is in-view. By analyzing how a user flips through a content item, intentional user interaction with the content item can be determined. For example, a user may flip through content items in a direction at a relatively consistent pace such that the time to flip is the same as the time in between flips. When such pacing is consistent, it is uncertain whether the user intentionally interacted with the content item. However, the user demonstrates intentional interaction with content item when the user slows down or pauses in between flips, flips through content items at an inconsistent pace, navigates in a different direction or slows down or pauses the first half of the next flip in order to extend the time a content item is in-view. Moreover, content items that the user may interact with can be predicted based on intentional user interactions with similar content items or content items associated with similar meta tags that describe the content item (e.g., format, topic etc.), and the predicted content items can be presented to the user. User preference for, interest in and interaction with the content item depends on how the user flips through content items in a digital magazine as described below in detail with respect to FIGS. 3 through 8.

System Architecture

FIG. 1 is a block diagram of an embodiment of a system environment 100 for organizing and sharing content via a digital magazine. In the example shown by FIG. 1, the system environment includes one or more content source devices 102, a client device 104, and a content processing system 106 connected to each other via a network 108. A source device 102 is a computing system capable of providing various types of content to a client device 104. Examples of content provided by a source device 102 include text, images, video, or audio on web pages, web feeds, social networking information, messages, or other suitable data. Additional examples of content include user-generated content such as blogs, tweets, shared images, video or audio, social networking posts, social networking status updates, and advertisements. Content provided by a source device 102 may be received from a publisher (e.g., stories about news events, product information, entertainment, educational material, etc.) and distributed by the source device 102. Content provided by a source device 102 may also be received from an advertiser (e.g., advertisements, sponsored content etc.) and distributed by the source device 102. For convenience, content, regardless of its composition, may be referred to herein as an "article," a "content item," or as "content." A content item may include various types of content, such as text, images, and video or content elements including headlines, top copy, and body text.

In one or more embodiments, the content processing system 106 is a digital magazine server that receives content items from one or more source devices 102, generates pages in a digital magazine by processing the received content items, and serves the pages to a client device 104. Example embodiments of a content processing system 106 are described in U.S. patent application Ser. No. 13/187,840, filed on Jul. 21, 2011, which is hereby incorporated by reference in its entirety.

The client device 104 is a computing device capable of receiving user input as well as transmitting and/or receiving data via the network 108. In one embodiment, the client device 104 is a conventional computer system, such as a desktop or a laptop computer. Alternatively, the client device 104 may be a device having computer functionality, such as a personal digital assistant (PDA), a mobile telephone, a smartphone, smartwatch, or another electronic device. In one embodiment, a client device 104 executes an application, such as a digital magazine application, that receives one or more pages generated by the content processing system 106 and presents the pages to a user of the client device 104. Additionally, an application executing on the client device 104 may communicate instructions or requests for content to the content processing system 106 to modify content presented to a user of the client device 104. As another example, the client device 104 executes a browser that receives pages from the content processing system 106 and presents the pages to a user of the client device 104. While FIG. 1 shows a single client device 104, in various embodiments, any number of client devices 104 may communicate with the content processing system 106.

Hence, the content processing system 106 obtains content items from multiple sources and generates one or more pages for presentation to the user that include the obtained content items in a suitable format. For example, the content processing system 106 determines a page layout including various content items based on information associated with a user and generates a page including the content items arranged according to the determined layout for presentation to the user via a client device 104. This allows the user to access content items via the client device 104 in a format that enhances the user's interaction and consumption of the content items. Accordingly, a user may achieve a reading experience of various content items from multiple source devices 102 via the client device 104 that replicates the experience of reading the content items via a print magazine. For example, a page generated by the content processing system 106 may present various content items in a layout that reduces horizontal or vertical scrolling by the user to access various content items presented on the page.

The source devices 102, client device 104, and the content processing system 106 are configured to communicate via the network 108, which may comprise any combination of local area and/or wide area networks, using both wired and/or wireless communication systems. In one embodiment, the network 108 uses standard communications technologies and/or protocols. For example, the network 108 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 108 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 108 may be represented using any suitable format, such as hypertext markup language (HTML) or extensible markup language (XML). In some embodiments, all or some of the communication links of the network 108 may be encrypted using any suitable technique or techniques.

Page Templates

A page template is used by the content processing system 106 to describe a spatial arrangement ("layout") of content items on a page for presentation by a client device 104. A page template includes slots, which each include one or more content items. Each slot has a size (e.g., small, medium, or large) and an aspect ratio. Examples of page templates are described in U.S. patent application Ser. No. 13/187,840, filed on Jul. 21, 2011, which is hereby incorporated by reference in its entirety.

Figure 2:
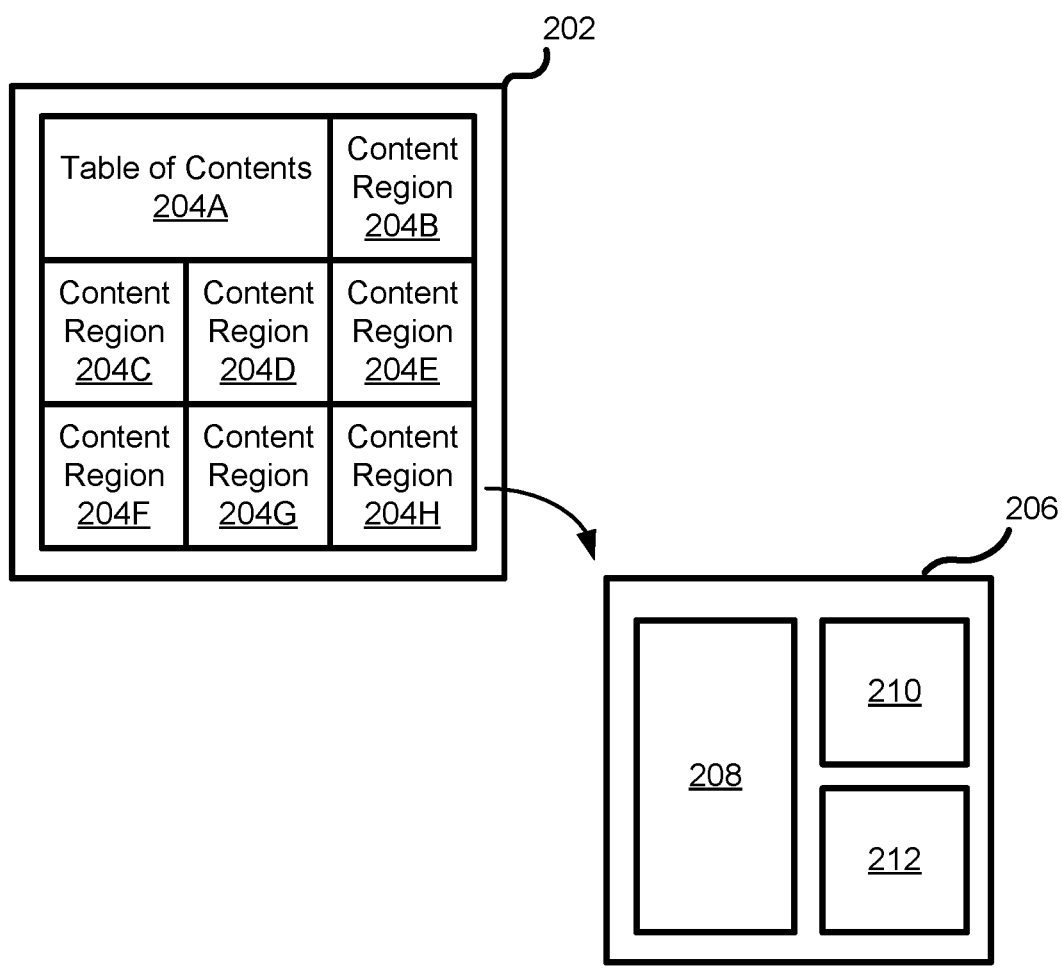
FIG. 2 is an example of a page template for presenting content using a digital magazine, in accordance with an embodiment.

FIG. 2 illustrates an example page template 202 having multiple rectangular slots each configured to include a content item. Other page templates with different configurations of slots may be used by the content processing system 106 to present one or more content items received from source devices 102. In some implementations, a page template may reserve one or more slots for specific types of content items having specific characteristics. For example, one or more slots in a page template are reserved for content items that are images. As another example, a page template may include a slot reserved for presentation of social network status updates, and the status updates may be grouped and displayed as a list in the slot included in the page template. In another example, one or more slots in a page template may be associated with content items received from a specific source device 102 or provided by a specific publisher (e.g., a specified news organization, a specified magazine magazines, content generated by a specified user, etc.) or by a specific advertiser (e.g., advertisements, sponsored content etc.).

As shown in FIG. 2, when a content processing system 106 generates a page, the content processing system 106 populates slots in a page template 202 with content items. Information identifying the page template 202 and the associations between content items and slots in the page template 202 is stored and used to generate the page. For example, the identified page template 202 and content items are retrieved, and the page is generated by including content items in slots of the page template 202 based on the associations. As used herein, a slot in which a content item is presented may be referred to as a "content region."

A content region 204 may include image data, text, data, a combination of image and text data, or any other information retrieved from a corresponding content item. For example, content region 204A represents a table of contents identifying sections of a digital magazine that are represented by content regions 204B-204H. For example, content region 204A includes text or other data identifying a table of contents, such the text "Cover Stories featuring," followed by one or more identifiers associated with various sections of the digital magazine. An identifier associated with a section may describe a characteristic common to at least a threshold number of content items in the section. For example, an identifier refers to the name of a user of social network from which content items included in the section is received, such as a user to which a user associated with client device 104 has formed a connection, association, or relationship via a social networking system. As another example, an identifier associated with a section specifies a topic, a newspaper, a magazine, a blog author, or other publisher associated with at least a threshold number of content items in the section. Additionally, an identifier associated with a section may further specify content items selected by a user of the content processing system 106 and organized as a section. Content items included in a section may be related topically and include text and/or images related to the topic.

Sections may be further organized into subsections, with each subsection also represented by a content region describing one or more content items included in the subsection. Referring to FIG. 2, section content region 204H may include a newspaper including three subsections represented by subsections 208, 210, and 212. Accessing section content region 204H presents an additional page 206 generated from a page template used by the newspaper to present the subsections 208, 210, and 212 in various slots. The subsections 208, 210, 212 may include content items grouped based on their associated topics, based on their associated authors, or based on any other suitable associated information. Further, a subsection may include one or more subsections, allowing the digital magazine to provide content items in a hierarchical structure.

Serving Content Based on User Interaction in a Flip-Based Environment

Embodiments of the digital magazine described herein may simulate the look and feel of reading a print magazine, while also providing benefits of digital media that cannot be achieved in print media. For example, when a user turns a page in the digital magazine, an animation simulating turning the page of a print magazine may be presented to provide a visual cue that the page has been turned or in the process of being turned. In certain situations, the digital magazine may simulate the turning of multiple pages. For example, if the user is reading an article that is several pages into a section and wants to return to the beginning of the section, simulating the turning of multiple intermediate pages may be desirable to provide the user with visual feedback about the result of the navigation. Similarly, if the user accesses a particular section from a table of contents, simulating the turning of multiple pages may provide the user with a useful visual cue.

To provide visual feedback to a user navigating through pages of a digital magazine, a digital magazine application executing on a client device 104 may present a user with animations or other effects simulating the turning of multiple pages when the user navigates through pages of the digital magazine. The pages presented by the animations simulating page turning may be blank or may include content. For example, when accessing the cover page of a section the user is currently reading, the digital magazine application may render recently viewed pages as one or more intermediate pages before displaying the cover page. This indicates to the user that pages are between the current page and the cover page and are being traversed until the cover page is reached. Examples of flipping through pages in a digital magazine are further described in U.S. patent application Ser. No. 13/284,678, filed on Oct. 28, 2011, which is hereby incorporated by reference in its entirety.

A flip is a navigation tool that allows users to seamlessly move from one screen in a mobile web browser or mobile application. This is typically done with an upward/downward, sideways or diagonal motion (with a user's thumb or fingers) on a touch display device of a mobile/tablet device, smartwatch or other electronic devices.

A flip can be used to determine user interaction with the content item. Specifically, by tracking how a user flips through pages, the interaction of the user in response to content items included in the displayed pages can be determined. In one instance, viewability of the content item can be determined based on intentional user interaction with the content item. In another instance, user preference for different content items or topics can be determined according to the user interactions. Moreover, future presentation of content items can be determined according to the user interaction or preference. Tracking certain attributes of flips can help determine user interactions in response to content items presented. Examples of certain attributes include timing of flips, an interval between flips, a change in the navigational direction of a flip, a difference in the time between the first and second halves of a flip etc. Detailed description of a flip navigation and determining the user preference is described below with respect to FIGS. 3A-3D and 4A-4G.

Figure 3A:
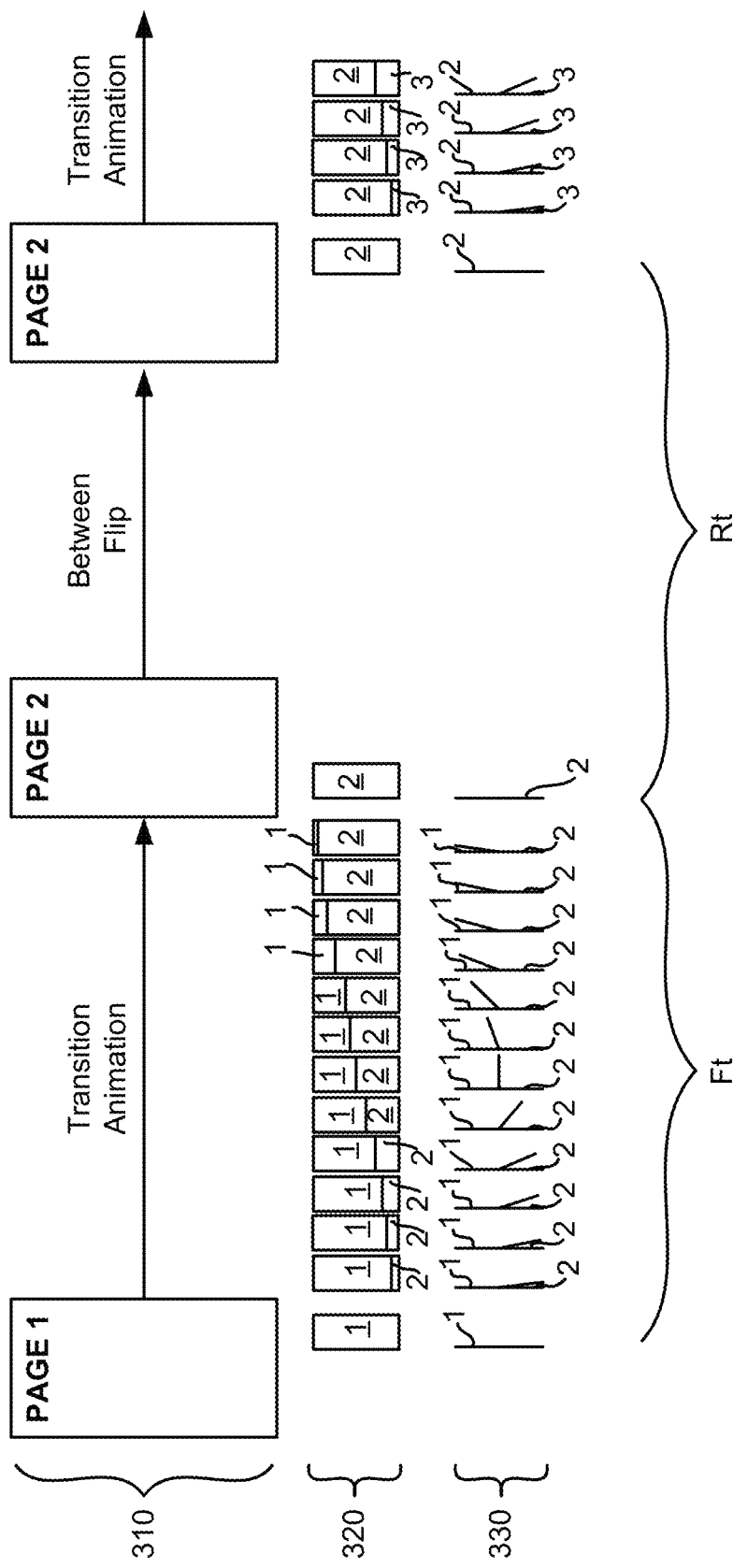
FIG. 3A is an example flip transition animation from one page to another, when it is uncertain that either the user interacted with the content or the user is presented with a preferred content item in accordance with an embodiment.
Figure 3B:
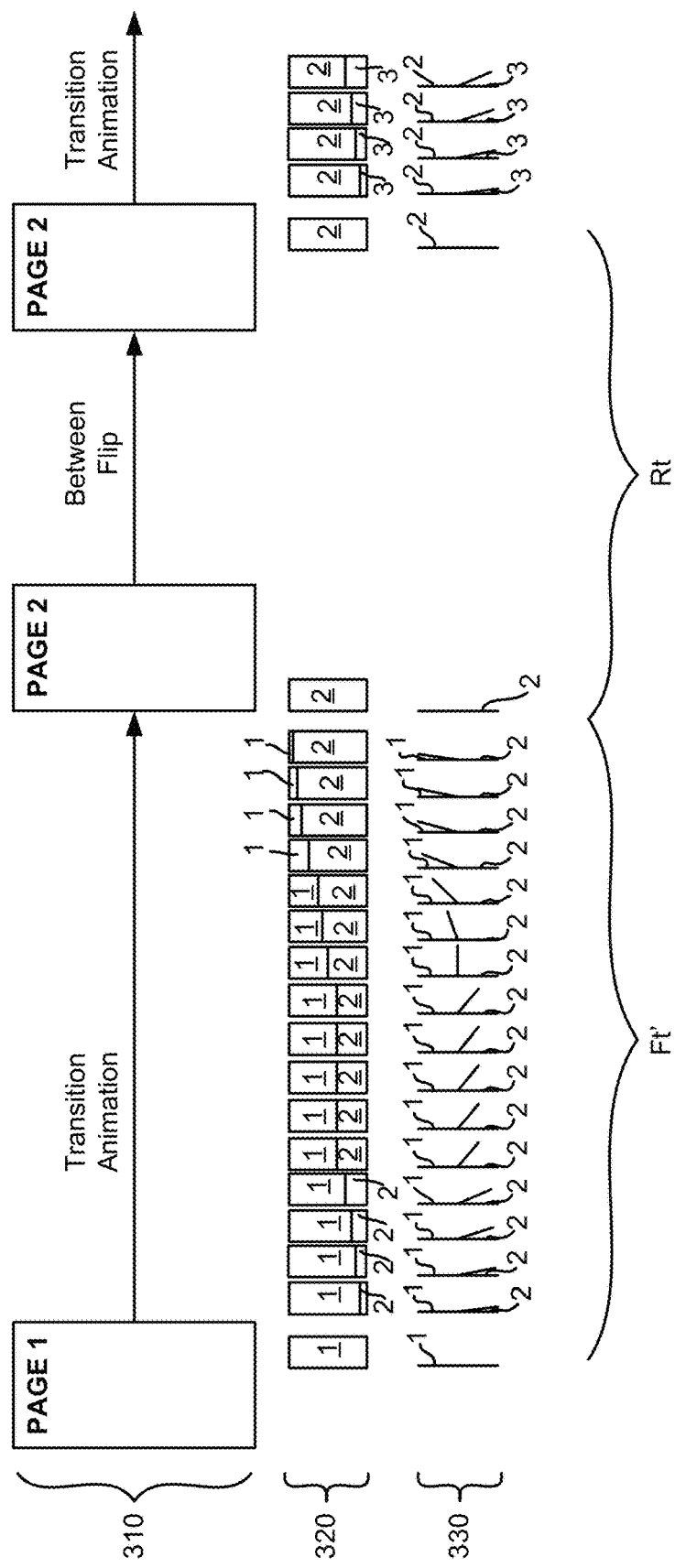
FIG. 3B is an example flip transition animation from one page to another with extended time to flip, when the user interacts with or is presented with a preferred content item in accordance with an embodiment.
Figure 3C:
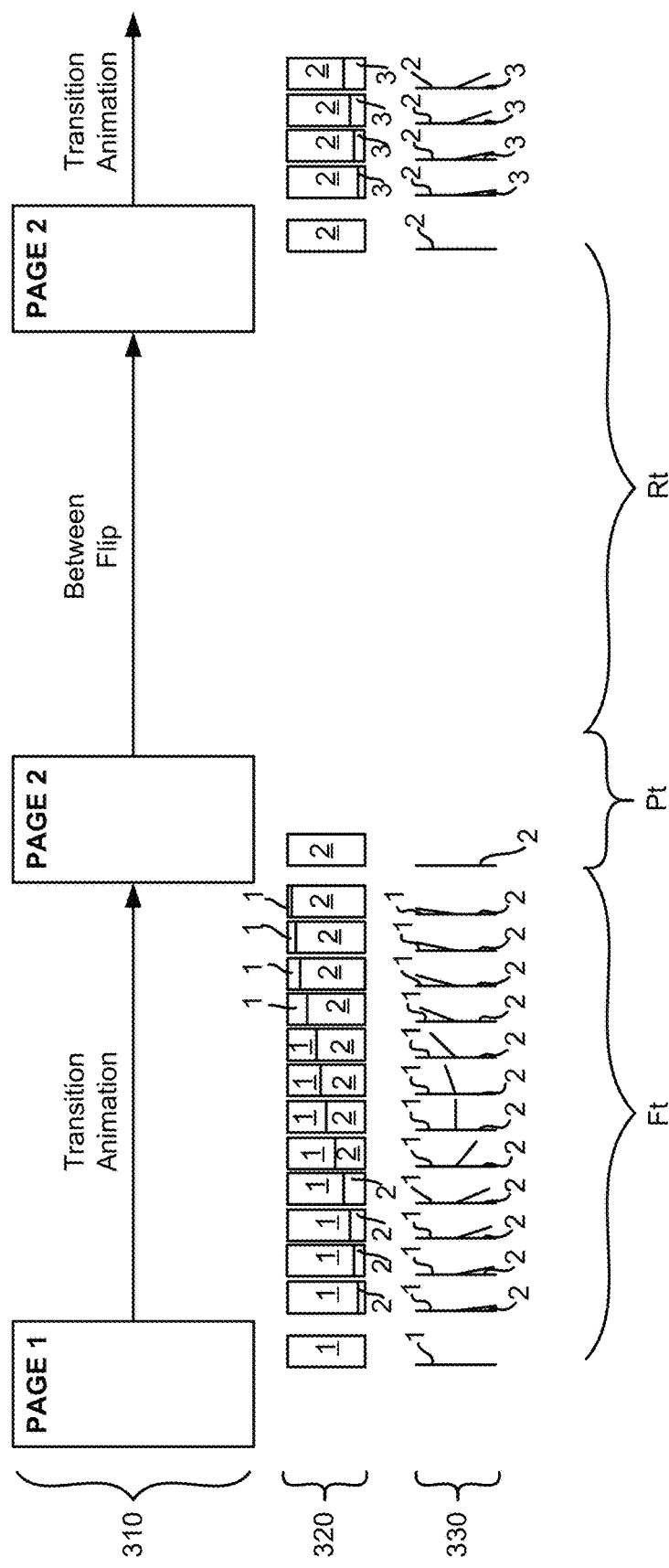
FIG. 3C is an example flip transition animation from one page to another with extended time to pause, when the user is presented with an interesting content item in accordance with an embodiment.
Figure 3D:
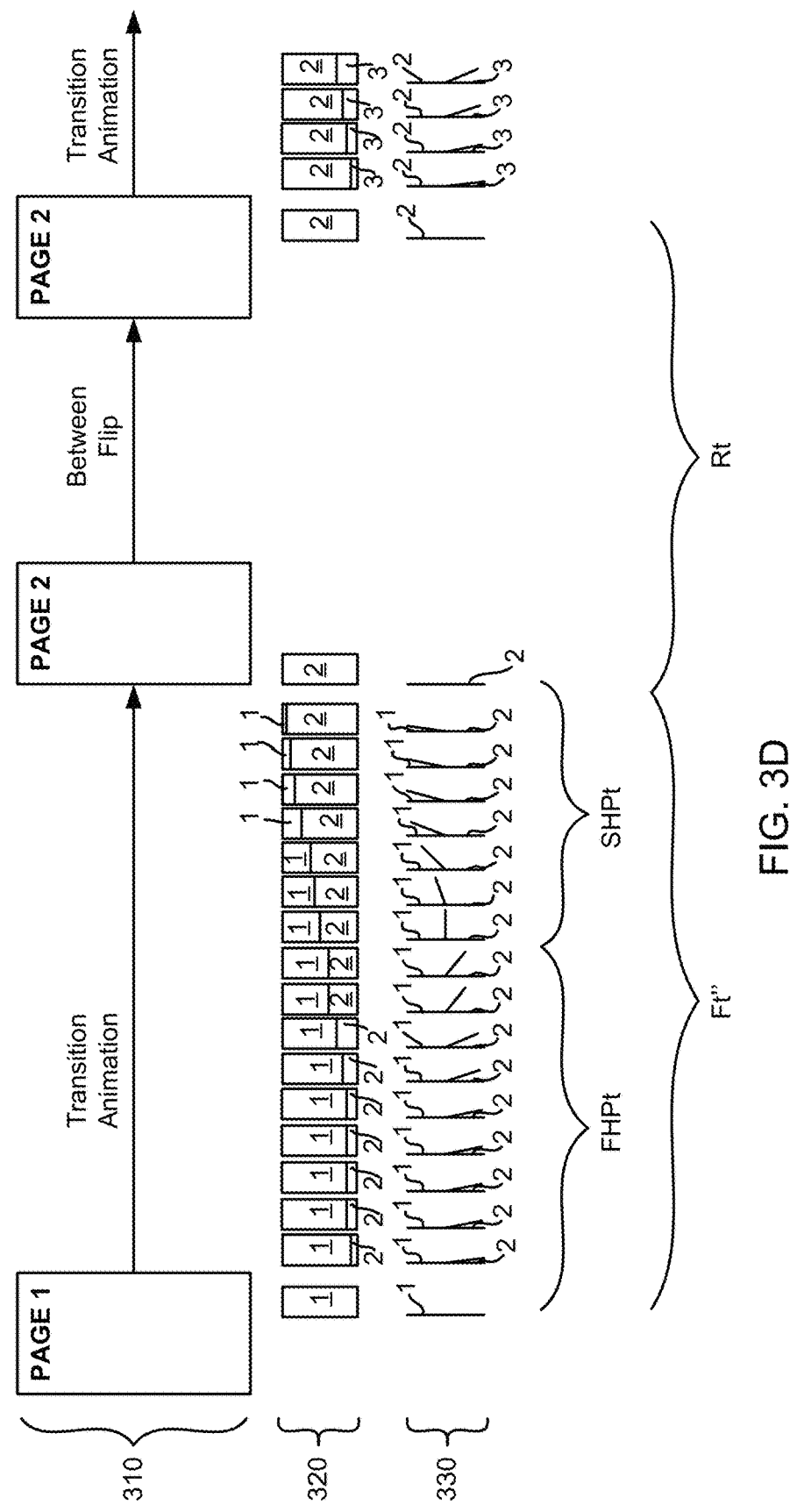
FIG. 3D is an example flip transition animation from one page to another page with slowdown in flipping while half or more than half of the content item is still in-view.

FIGS. 3A-3D illustrate a difference in timings of flip and/or an interval between flips depending on the user interaction with content items or user preference. FIG. 3A is an example flip transition animation from one page to another, when it is uncertain that either the user interacted with the content or the user is presented with a preferred content item in accordance with an embodiment. FIG. 3B is an example flip transition animation from one page to another with extended time to flip, when the user interacts with a content item or the user is presented with a preferred content item in accordance with an embodiment. FIG. 3C is an example flip transition animation from one page to another with extended time to pause, when the user interacts with a content item or the user is presented with a preferred content item in accordance with an embodiment. FIG. 3D is an example flip transition animation from one page to another page with slowdown in flipping while half or more than half of the content item is still in-view.

According to a user gesture (e.g., sliding a bottom of a touch display device to a top of the touch display device), an animation of flipping through different pages may be displayed. In the example shown in FIG. 3A, the transition animation begins with page 1 and ends with page 2, then a subsequent transition animation begins with page 2 and ends with page 3 as illustrated by a generic layer 310. A sequence of animation of flipping is shown in a top view layer 320 and a side view layer 330.

FIGS. 4A-G illustrate a flip transition animation sequence from one page to another page in accordance with an embodiment. Pages shown in FIGS. 4A-4G may correspond to pages in the top view layer 320 in FIGS. 3A-3D. FIGS. 4A-G show flip axis 410 and pages 420 and 430 to the extent any such portions thereof are visible. Page 420 has halves 422 and 424, and page 430 has halves 432 and 434. The appropriate halves are shown depending on the time slice of the animation sequence. The flip transition animation is a bottom to top vertical flip.

Figure 4A:
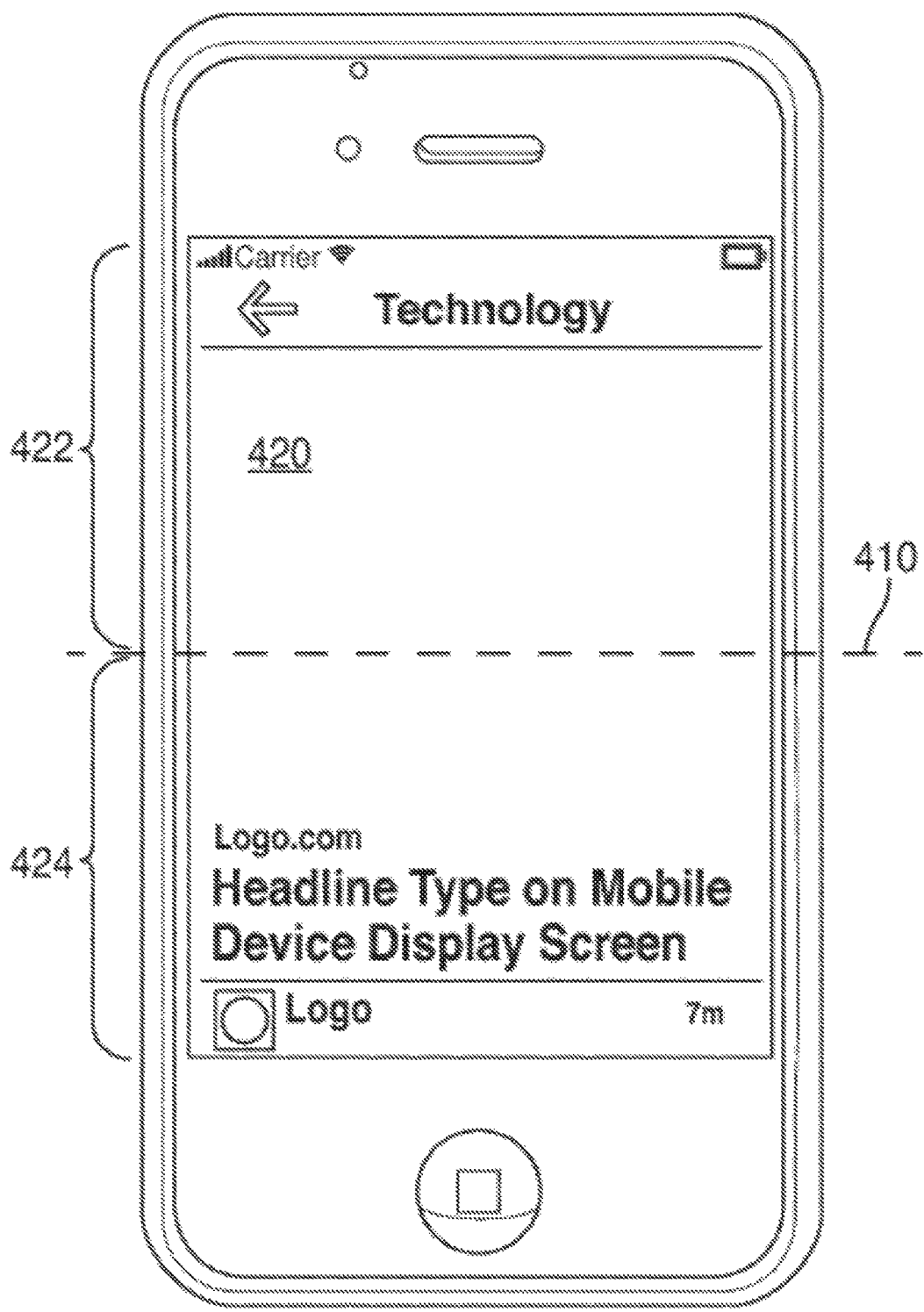
FIGS. 4A through 4G illustrate an example flip transition animation sequence from one page to another page.
Figure 4B:
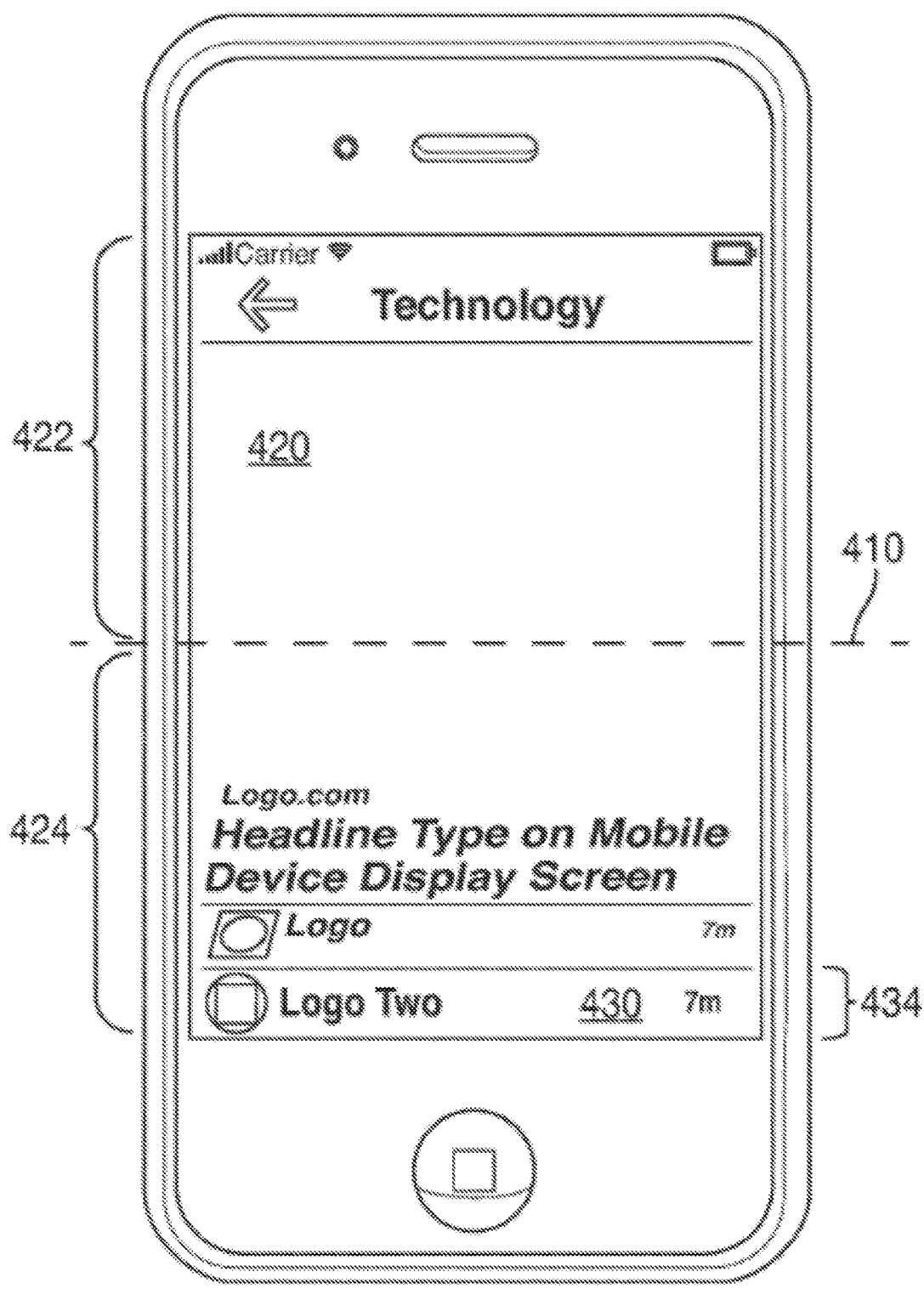
Figure 4C:
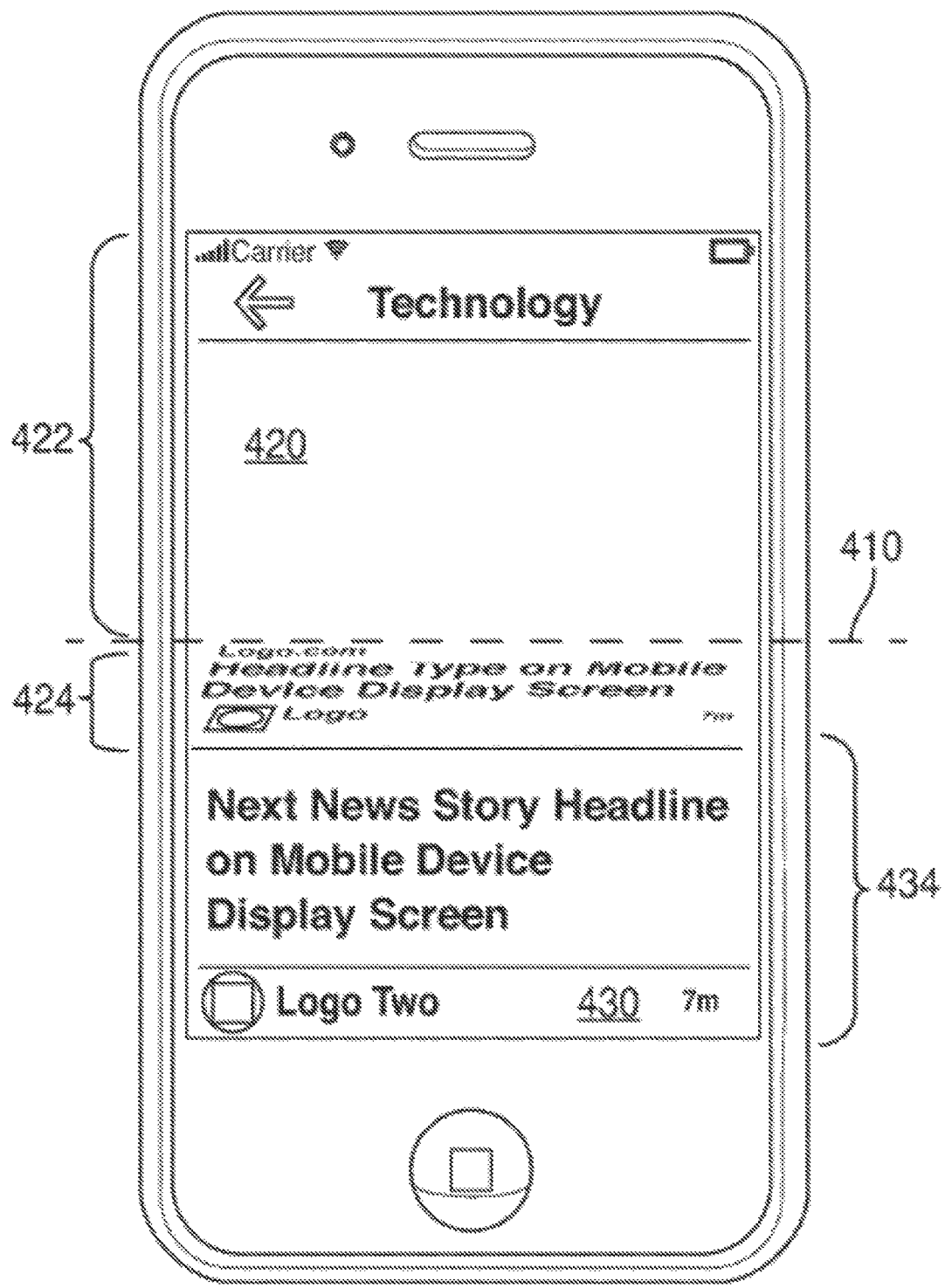
Figure 4D:
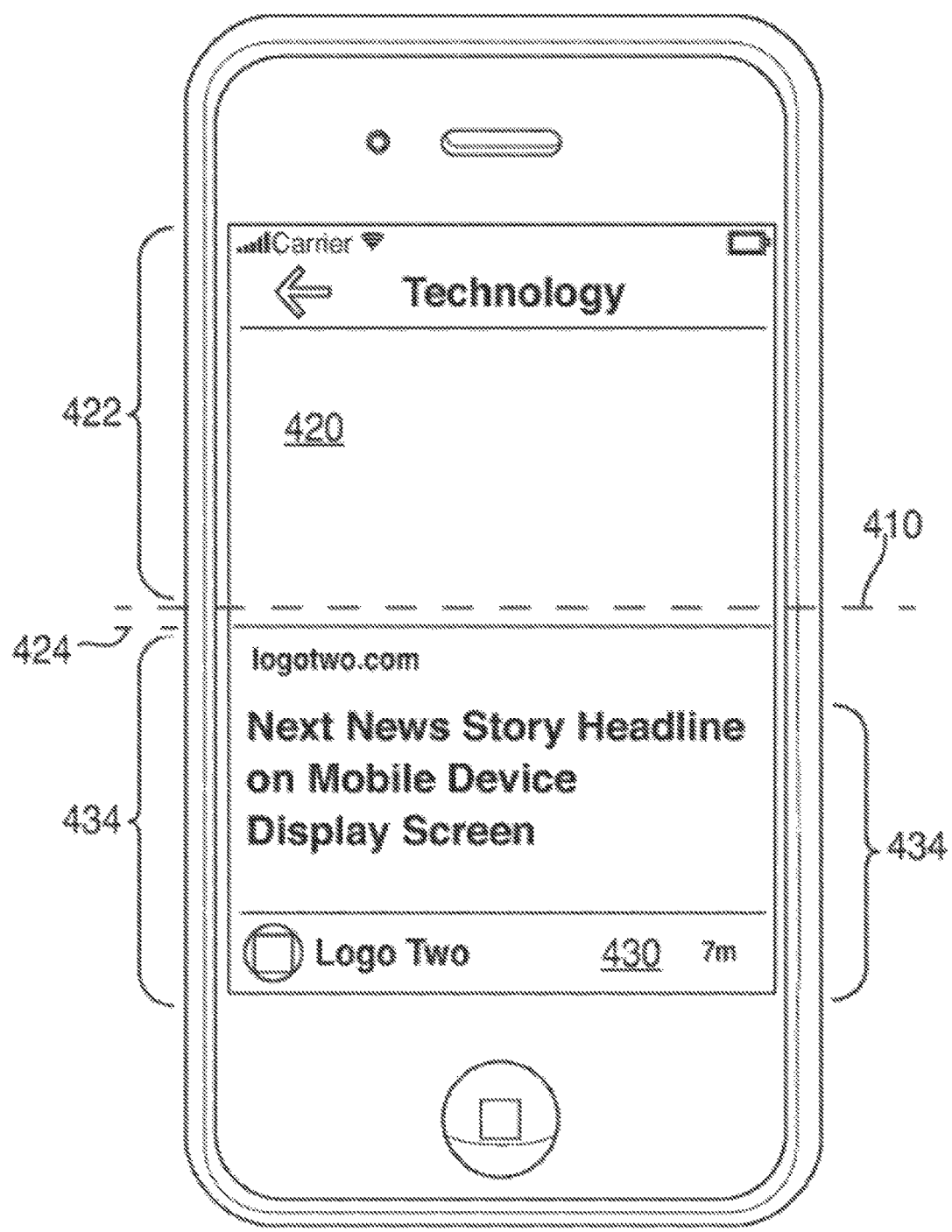
Figure 4E:
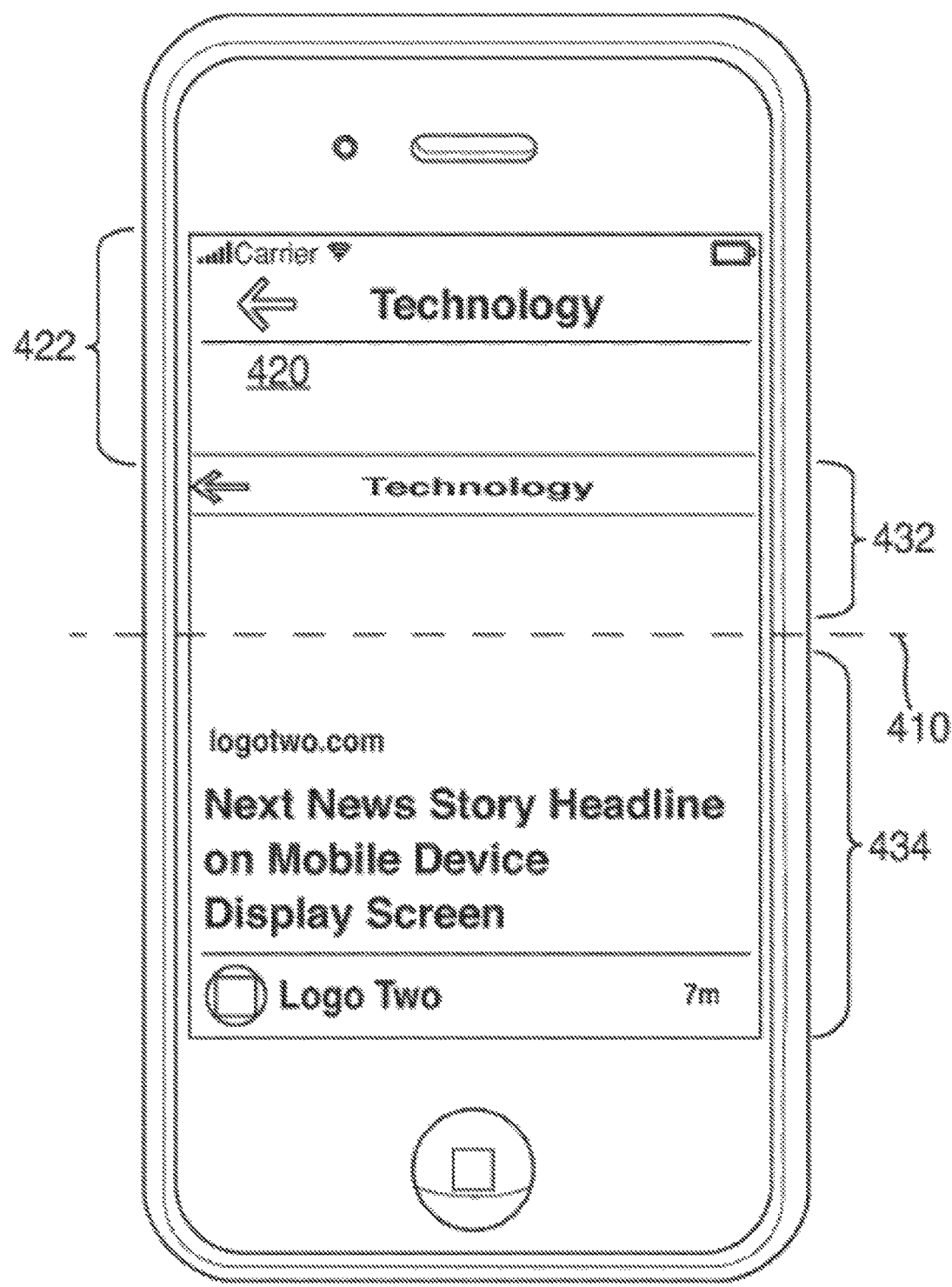
Figure 4F:
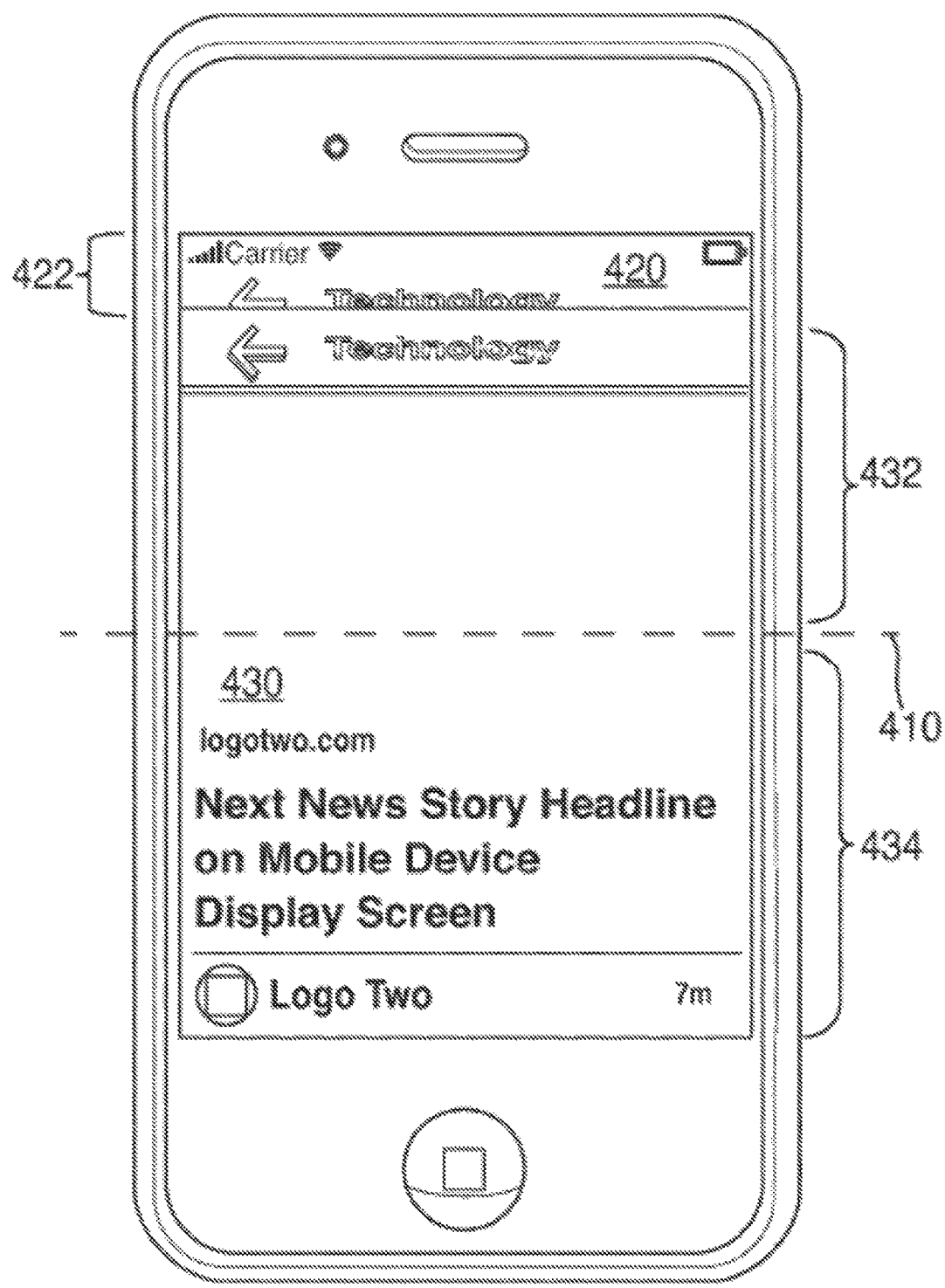
Figure 4G:
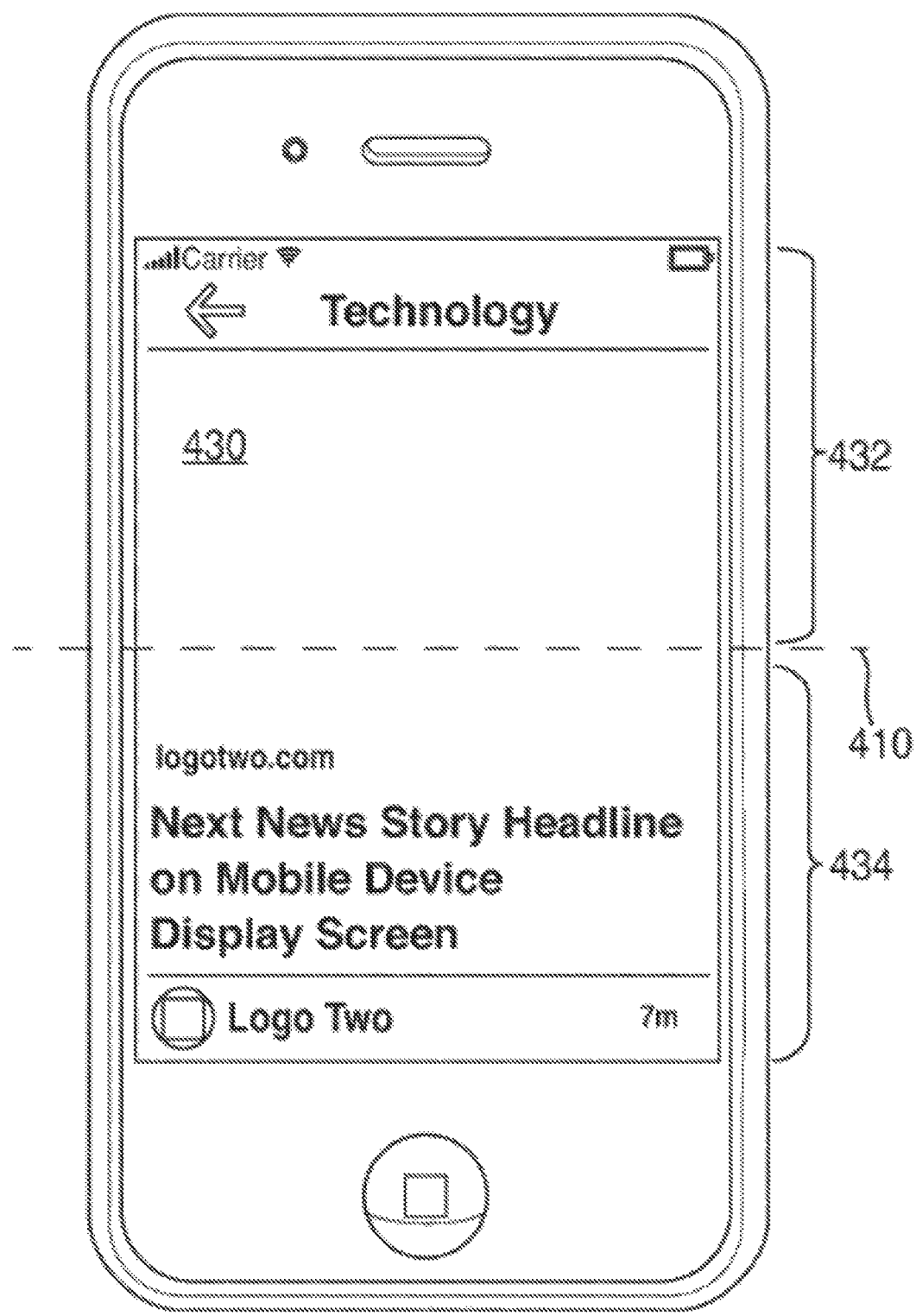

FIG. 4A shows a full view of page 420. FIG. 4B shows half 424 lifting off to reveal half 434. FIG. 4C shows half 424 further along in its flight path to the top half, but not yet having crossed flip axis 410. FIG. 4D shows half 424 at the halfway point in its flight path, fully revealing half 434. Any progression of half 424 beyond flip axis 410 results in having half 432 shown instead of half 424, as indicated by FIG. 4E. FIG. 4F 20 shows how yet further progression of half 424 (not shown) covers more of half 422 and reveals more of half 432. FIG. 4G shows a full view of page 430.

Returning back to FIG. 3A, the user may slide a touch display with a finger, for example, from a bottom half of the touch display to a top half of the touch display for a time period Ft (i.e., time to flip). Time to flip Ft herein is referred to a time period during which the user navigates from one page to another through a flip. During the slide, a user's finger may be in contact with the touch display, and a corresponding page of the transition animation is displayed according to a position of the user's finger. Once the flip is complete and the content item is fully displayed on the page, the user's finger may remain paused and in contact with the display for a time period Pt (i.e., time to pause). Time to pause Pt is herein referred to a time period during which the user pauses to view content items after the flip is completed while the user's finger remains in contact with the display and before the user starts retracting the finger for the next flip. The time to pause Pt may be measured directly based on the time in which a finger stops flipping the page and the time the finger is no longer in contact with the screen. After time to flip Ft and time to pause Pt, the user may lift his/her finger from the touch display, and retract the finger, for example, back to the bottom of the touch display device for a time period Rt (i.e., time to retract) to initiate flipping of page 2. Time to retract Rt herein is referred to a time period during which the user retracts a finger back into a position to initiate a next flip. By repeating the sequence of flipping, pausing, and retracting as shown in FIG. 3A, the user can navigate through different pages.

When a user intentionally interacts with content items or is presented with preferred content items, time consumed for flipping will be less than a time interval between flips. For example in FIG. 3B, the user interacting with or encountering preferred content items slows down a pace of flipping such that the time to flip Ft' increases compared the time to flip Ft when it is uncertain the user is intentionally interacting with preferred content items in FIG. 3A. For another example in FIG. 3C, the user pauses for a time period Pt (i.e., time to pause) or slows down the time to retract Rt, after the flipping is completed such that the sum of Pt and Rt is greater than Ft (i.e., Pt+Rt>Ft). For another example in FIG. 3D, the user slows down or pauses the time to flip the first half of the page FHPt relative to the time to flip the second half of the page SHPt in order to extend the time that the content item is in-view before fully flipping to the next content item. In other embodiments, a change in time to flip Ft, time to pause Pt, time to retract Rt, time to flip to the first half of the page FHPt, time to flip to the second half of the page SHPt or any combination of them can indicate user interaction with or preference for certain content items.

Although not shown for simplicity, a change in a flip direction can also indicate intentional user interaction with certain content items or user preference. For example, a user that does not intentionally interact with or does not prefer content items may continue to flip through a direction, but may change the navigational direction of a flip when intentionally interacts with or is presented with preferred content items. Alternatively, the user that intentionally interacts with content items or is presented with preferred content items may change directions to engage in content items.

In one embodiment, attributes of flipping (e.g., time to flip Ft, time to pause Pt, time to retract Rt, time to flip the first half of the page FHPt, time to flip the second half of the page SHPt, or change in navigational direction of the flip) are analyzed for determining a user interaction in response to a certain content item. The user's intentional interaction with or preference for different content items by a user can be identified as one of "active slowdown or pausing in between flips," "inconsistent pace of flipping," "change in navigational direction" and "extended first half of page flip time". "Active slowdown or pausing in between flips" indicates that the user slows down or pauses in between flips such that the time to flip Ft is less than the sum of the time to pause Pt and the time to retract Rt. "Inconsistent pace of flipping" indicates that Ft is inconsistent from flip to flip (or beyond the predetermined or statistically derived range). "Change in navigational direction" indicates that the user has flipped a page in a different direction to a previous flipping direction. "Extended first half of page flip time" means that the user slows down the time to flip the first half of the page FHPt in order to extend the time a content item is in-view such that FHPt is greater than the time to flip the second half of the page SHPt. "Consistent pace of flipping" indicates that the user flips through pages at a consistent pace such that the time to flip Ft is the same as the sum of the time to pause Pt and the time to retract Rt. "Consistent flipping" means that it is uncertain the user interacts with or is encountered with preferred content items, whereas "active slowdown or pausing in between flips," "inconsistent pace of flipping," "change in navigational direction" and "extended first half of page flip time" may indicate that the user has intentionally interacted with content items or is presented with preferred content items. By identifying user interactions associated with flips in response to encountering different content items, corresponding processes can be performed to analyze user interaction with content items or user preference. Details of identifying user interactions and performing corresponding processes are described below with respect to FIG. 5.

Figure 5:
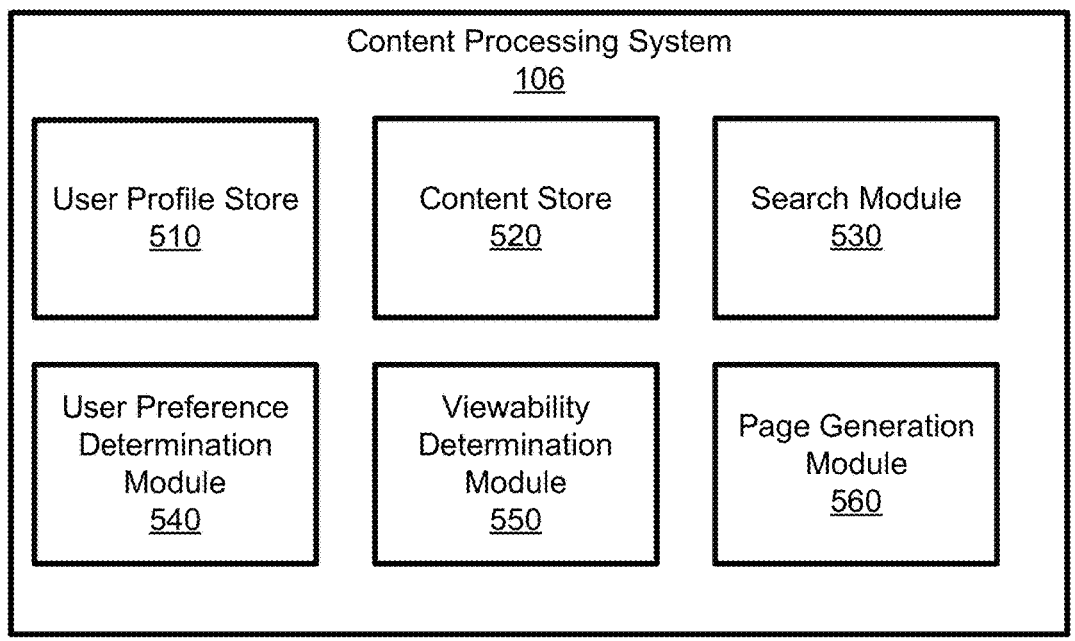
FIG. 5 is a block diagram of an example diagram of a content processing system in accordance with an embodiment.

FIG. 5 is a block diagram of an example diagram of a content processing system 106. In one embodiment, the content processing system 106 includes a user profile store 510, a content store 520, a search module 530, a user preference determination module 540, a viewability determination module 550, and a page generation module 560. These components operate together to generate content pages according to information describing attributes of flips and transmit the content pages including content items that users may interact with or may prefer to the client device 104 for presentation. In other embodiments, the content processing system 106 may include different, fewer, or additional components.

The user profile store 510 stores user profiles. A user profile includes information about the user that was explicitly shared by the user and may also include profile information inferred by the content processing system 106. In one embodiment, a user profile includes multiple data fields, each describing one or more attributes of the corresponding user. Examples of information stored in a user profile include biographic, demographic, and other types of descriptive information, such as gender, hobbies, preferences or interests, purchase behavior, location, data describing interactions by a corresponding user with content items presented by the content processing system 106, or other suitable information. For example, the user profile store 510 stores, for a user, "consistent flipping" for content items related to 'fashion', "active slowdown or pausing in between flips" for content items related to 'finance', "inconsistent pace of flipping" for content items related to 'new presidential election', and "change in navigational direction" for content items related to 'Olympics' and "extended first half of page flip time" for content items related to 'celebrity news'.

The content store 520 stores various types of digital content from the source devices 102. Examples of content items stored by the content store 520 include a page post, a status update, a photograph, a video, a link, an article, a photograph, video data, an advertisement, sponsored content and any other type of digital content. In addition, the content store 520 stores meta tags associated with content items. Each meta tag indicates a topic, a weighting for that topic based on how relevant that topic is to the content item, whether that meta tag is associated with the content item or a specific content element within the content item, and what the associated content item and content element are related to.

The search module 530 receives a search query from a user through the client device 104 and retrieves content items from one or more source devices 102 or from the content store 520 based on the search query. For example, content items having at least a portion of an attribute matching at least a portion of a search query are retrieved from one or more source devices 102. In one embodiment, the search module 530 generates a section of the digital magazine including the content items identified based on the search query.

The user preference determination module 540 receives information describing attributes of flips from a client device 104, and determines user preference for content items. The information describing the attributes of the flips indicates a user behavior of flipping different pages. Example information describing the attributes of the flips include, content items included in one or more pages, flipping direction, time to flip Ft, time to pause Pt, time to retract Rt, time to flip the first half of page FHPt, etc.

In one embodiment, the user preference determination module 540 determines a user preference for content items based on "user interaction" with content as determined by flip-based navigation. Examples of "user interaction" include "active slowdown or pausing in between flips," "inconsistent pace of flipping," "change in navigational direction" and "extended first half of page flip time". Based on the information describing the attributes of flips, the user preference determination module 540 can identify "user interaction" of flips as followed.

"Active slowdown or pausing in between flips" indicates the user slows down or pauses in between flips. This is based on the time to pause for a period of time Pt and the time to retract a finger into position to flip again for a period of time Rt. In this scenario, a user is not simply navigating through the browser or application, but rather intentionally slowing down or briefly pausing between flips. There are two ways in which users do so: the user can either pause after the flip with the user's finger still touching the display such that Pt is greater than 0 or slow down the motion of retracting a finger to position for the next flip such that Rt is greater than Ft or a combination of both such that the sum of Pt and Rt is greater than Ft.

"Change in navigational direction" indicates that the user has flipped a page in a different direction to a previous flipping direction regardless of a pace of the flip or time in-view of the content. This means that the user is intentionally changing direction in order to interact with content, regardless of a pace of flip or time in-view of the content.

"Inconsistent pace of flipping" indicates a user navigates flipping with an inconsistent pace, either because the time to flip Ft is inconsistent or the time interval in between flips (Pt+Rt) is inconsistent. Such condition indicates intentional user interaction with the content before flipping to the next page.

"Extended first half of page flip time" means that the user slows down the first half of the next flip FPHt relative to the time to flip through the second half of the same page SPHt in order to extend the time a content item is in-view. Such conditions indicate intentional user interaction with the content item before completing the flipping to the next page.

In one embodiment, after determining intentional "user interaction" of flips, the user preference determination module 540 performs corresponding processes to determine user preference for content items or topics. For example, responsive to determining that a flip is associated with "active slowdown or pausing between flips," the user preference determination module 540 determines the probability of serving a viewable impression based on user interaction with the content item. For another example, responsive to determining that there is a consistent pattern of user interactions with particular content items or content topic, the user preference determination module 540 validates this pattern using statistical analysis in order to serve content items or content items associated within a specific content topic given the higher preference for that topic by the user. According to different analysis performed based on the determined "user interaction" of flip, content items that the user is likely to interact with or content items that the user prefers can be predicted. The predicted content items that the user is likely to prefer to view can be determined to be presented in future pages. Various processes performed by the user preference determination module 540 in response to "user interaction" are summarized below.

Track intentional user interactions based on flipping navigation.

Determine user preference for content items or topics based on user interaction or statistical patterns of interaction with content items.

Leverage user preference for content items to predict user preference for other content items.

Present user with predicted content items.

Track user interactions with content items based on flipping navigation.

Refine predictive models based on ongoing user interaction with content items.

In one or more embodiments, the user preference determination module 540 generates a user interest profile based on the user interactions on content items. A user interest profile indicates a list of topics preferred by a user and the relative preference of those topics. In one aspect, the user preference determination module 540 determines from content items presented to a user, a subset of content items to which the user responded with intentional user interaction or a pattern of user interactions. For example, "active slowdown or pausing between flips," "change in navigational direction," or both are determined to be an intentional user interactions. The user preference determination module 540 identifies meta tags associated with the determined subset of content items, and generates an interest profile including a list of topics indicated by the identified meta tags. For example, an interest profile associated with a user is {"dog", "pet", "fashion"}, indicating that the user is interested in content items related to "dog," "pet" and "fashion." In another instance, those meta tags can be associated with content types (e.g., text, audio, images, video) such that interest profiles can be created based on what type of content a user intentionally interacts with. In another instance, meta tags can be associated with content elements (e.g., headlines, top copy, body text) such that interest profiles can be created based on what the user intentionally interacts with as the user browses content. The interest profile may be stored by the user profile store 510. Various processes performed by the user preference determination module 540 in response to "user interaction" are summarized below.

Track intentional user interactions based on flipping navigation.

Determine user preference for content items based on user interaction or statistical patterns of interactions with content items.

Determine user preference for topics based on meta tags associated with content items that users interacts with or specific content types or content elements that the user interacts with.

Create user interest profiles based on content items and topics associated with content items or specific content types or content elements that the user interacts with.

Leverage user interest profiles to predict user preference for content items, content topics and content types.

Present user with predicted content items or content items associated with predicted topics to users.

Track user interactions with content items based on flipping navigation.

Refine predictive models based on ongoing user interaction with content items and interactions with predicted content items.

In one or more embodiments, the viewability determination module 550 determines viewability of a content item. The viewability determination module 550 may determine viewability of the particular content item based on the intentional user interaction of flipping. In one embodiment, a content item is considered viewable if a user intentionally interacts with the content item regardless of the amount of time the content item is in-view. For example, the viewability determination module 550 can determine that an advertisement is viewable if the user responded with an intentional interaction with the advertisement e.g., "active slowdown or pausing between flips", "inconsistent page flipping", "change in navigational direction, "extended first half of page flip time" etc. The viewability determination module 550 transmits information describing the determined viewability of the content item to a source device 102 or a content provider of the content item. Viewability can be measured as binary (e.g., whether the user had an intentional user interaction with the content item or not) or as probability of being viewable (e.g., a probability of the user having an intentional user interaction with the content item) and counted towards viewability as a weighted score or weighted impression count (e.g., weighted average number of viewable impressions based on the number of impressions and the probability that each impression was viewable) can be determined across multiple user interactions. The information describing viewability of a content item allows the content provider to gauge effectiveness of presentation of the content item.

In one embodiment, after determining the viewability of advertising content based on an intentional user interaction with the content item, the viewability determination module 550 performs corresponding processes to determine viewability or the probability of viewability associated with content items or content topics. For example, responsive to determining that a flip is associated with "active slowdown or pausing between flips," the viewability determination module 550 determines the probability of serving a viewable advertising content based on user interaction with similar or related content items or content items associated with similar or related content topics. The viewability determination module 550 validates this pattern using statistical analysis in order to serve content items that have a higher probability of the intentional user interaction with that content item. According to different analysis performed based on the determined "user interaction" of flip, content items or content topics that the user is likely to deem viewable are predicted. The predicted content items or content items associated with content topics that the user is likely to deem viewable can be determined and presented in future pages. Various processes performed by the user preference determination module 540 in response to "user interaction" are summarized below.

Track user interactions with content items including sponsored content as well as topics associated with content items based on flipping navigation.

Predict intentional user interactions with content items and content items associated with content topics.

Serve predicted content items including sponsored content and advertisements based on predictions.

Track intentional user interactions with content including sponsored content and advertisements based on flipping navigation.

Calculate the statistical probability of the user interaction as being a strong interaction.

Refine predictive models based on ongoing intentional user interaction with content including sponsored content and advertisements.

The page generation module 560 generates page information (e.g., page template) describing a layout of different content items to be presented. In one aspect, the page generation module 560 generates page information describing a page that includes the determined content items from the user preference determination module 540. The page generation module 560 retrieves content items from one or more source devices 102 or from the content store 520, and generates a page including the content items. The page generation module 560 may associate the content item with a section configured to present a specific type of content item or to present content items having one or more specified characteristics. The page information can be transmitted to the client device 104 for presentation.

In one embodiment, the page generation module 560 generates the page including sponsored content and advertisements determined according to user interaction with or preference for content items. The page generation module 560 facilitates source devices 102 or other vendors to present advertisements to a user of the client device 104. An advertisement of a product or a service may be arranged in a page or in a transition animation between two flips. In one approach, the page generation module 560 analyzes user interaction with or preferences for content items being viewed by a user of the client device 104, determines a product or a service that the user is likely to interact with or prefer, for example, based on the interest profile of the user, and includes the advertisement corresponding to the determined product or service in the page for transmission to the client device 104. In another approach, the page generation module 560 identifies other users having similar user profiles (e.g., age, gender, interests, geographic location, purchase behavior etc.) with the user, analyzes user preferences or interest profiles of the other users to determine an advertisement related to a content item that the user may interact with or prefer, and includes the identified advertisement in the page for transmission to the client device 104.

In some embodiments, the page generation module 560 determines advertisements or sponsored content that is viewable or has the highest probability of being viewable based on "user interaction". In this application, flip navigation is measured to determine intentional user interaction with advertisements or sponsored content to qualify them as viewable. Not only can these metrics be used to determine whether an impression is viewable or not under this standard, but they can be used to predict the best time and place to serve advertisements and sponsored content (that is to say, when advertising and sponsored content impressions has the highest probability of qualifying under the user interaction clause as viewable). Predictive analytics could be used at individual or group (by demographics, by interest, etc.) levels to maximize the chance that impressions are viewable. For example, a set of users may have a higher probability of interacting with advertising related to "design", or another set of users may have a higher probability of interacting with advertising when reading "design" content.

Figure 6:
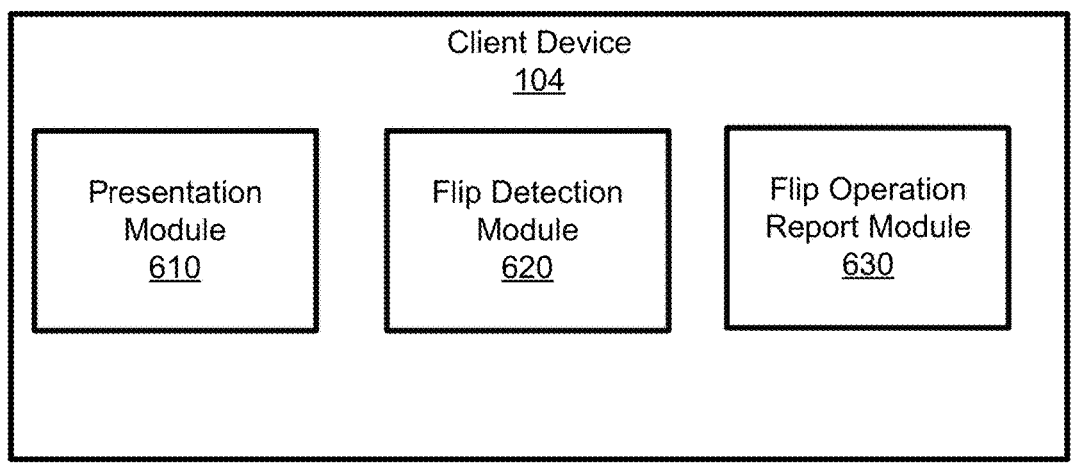
FIG. 6 is a block diagram of an example diagram of a client device in accordance with an embodiment.

FIG. 6 is a block diagram of a client device 104 according to one embodiment. In the embodiment illustrated in FIG. 6, the client device 104 includes a presentation module 610, a flip detection module 620, and a flip operation report module 630. These components operate together to present content items in digital magazine pages to a user of the client device 104. In other embodiments, the client device 104 may include different, fewer, or additional components.

The presentation module 610 receives the page information describing a page including content items from the content processing system 106 (e.g., page generation module 560), and renders a visual representation of the page. In one example, the presentation module 610 displays the page on a touch display device.

The flip detection module 620 receives an input signal obtained from the touch display device, and determines an input operation associated with the input signal. The flip detection module 620 analyzes series or parallel input signals received at the input device to determine the details of the input operation. Specifically, the flip detection module 620 determines a type of input operation (e.g., slide operation, drag operation, etc.) and attributes associated with the determined input operation. For example, in response to a user gesture of flipping a page by sliding a finger from one position to another position on a touch display device, the flip detection module 620 determines a direction, time, a velocity, etc. of the flip.

The flip operation report module 630 generates information describing attributes of flips, and transmits the information to the content processing system 106 (e.g., user preference determination module 540). The information describing the attributes of flips may be used by the user preference determination module 540 for determining content items that may be of interests to the user, as described above with respect to FIG. 5.

Figure 7:
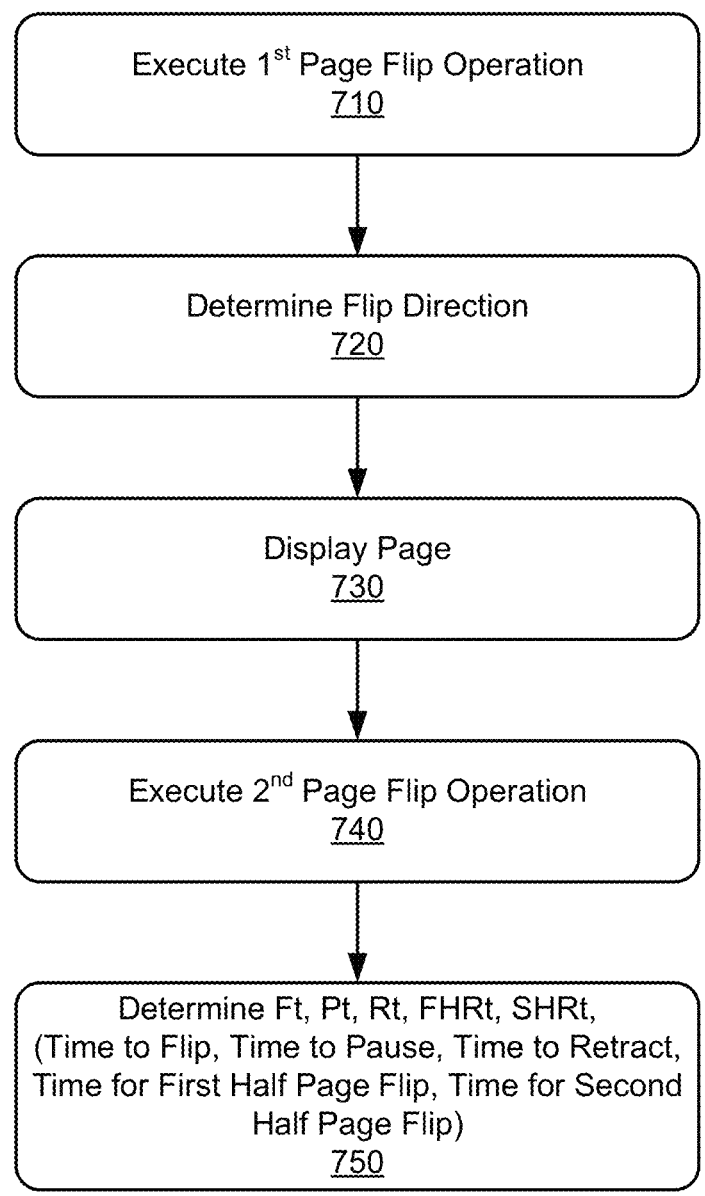
FIG. 7 is an example flow chart of determining attributes of a flip in accordance with an embodiment.

FIG. 7 is an example flow chart of determining attributes of a flip. The steps in FIG. 7 may be performed by the client device 104. In other embodiments, some or all of the steps may be performed by other entities. In addition, some embodiments may perform the steps in parallel, perform the steps in different orders, or perform different steps.

The client device 104 detects a user operation to flip a page, and executes 710 the user operation. The client device 104 determines a direction of the flip, and displays 730 a page to provide a visual feedback to the user, in response to the user operation. For example, the client device 104 displays a transition animation according to a position of a finger while executing the flip operation. After the flip is completed, the client device 104 displays the next page.

The client device 104 determines 740 a time to flip Ft, a time to pause Pt, a time to retract, time to flip the first half of the page FHPt, and time to flip the second half of the page SHPt. In one embodiment, the client device 104 determines that a time period between time corresponding to a start of a flip of a page and time corresponding to an end of the flip is the time to flip Ft. In addition, the client device 104 may determine that a time period between time corresponding to the end of the flipping the page with the user's finger still touching the display and time corresponding to start of retracting for flipping the next page is the time to pause Pt. In one aspect, the time to pause Pt is obtained by determining a duration of a finger in touch with a touch screen device at a same location after the flip is completed, and before the finger is lifted from the touch screen device. Moreover, the client device 104 may determine that a time period during which the user retracts a finger back into a position to initiate a next flip after the finger is lifted (or after time to pause Pt) is the time to retract Rt.

Based on the direction of the flip as well as timing information (e.g., Ft, Pt, Rt, FHPt, and SHPt), user interaction with or preference for content items can be determined.

Figure 8:
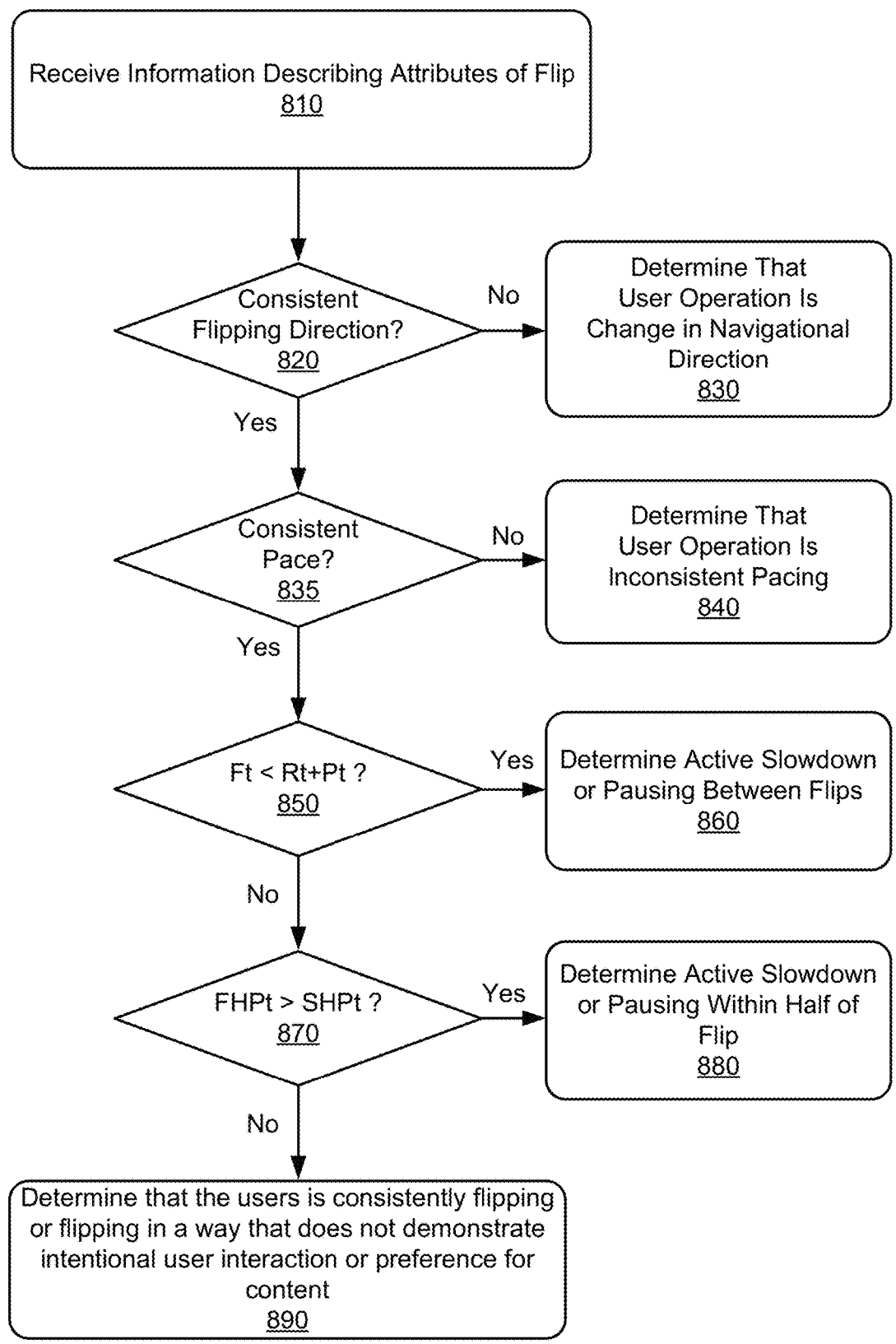
FIG. 8 is an example flow chart of determining a user interaction based on the attributes of the flip.

FIG. 8 is an example flow chart of determining a user interaction based on the attributes of the flip. The steps in FIG. 8 may be performed by the content processing system 106. In other embodiments, some or all of the steps may be performed by other entities. In addition, some embodiments may perform the steps in parallel, perform the steps in different orders, or perform different steps.

The content processing system 106 receives 810 information describing attributes of a flip from a client device 104. Examples of attributes of a flip include a direction of a flip, time to flip Ft, time to pause Pt, time to retract, Rt, time to flip the first half of the page FHPt, and time to flip the second half of the page SHPt, etc.

The content processing system 106 determines 820 whether a direction of the flip is consistent with a direction of a previous flip. Responsive to determining that the direction of the flip is inconsistent, the content processing system 106 determines 830 that the user interaction is "change in navigational direction."

Responsive to determining that the direction of the flip is consistent, the content processing system 106 determines 835 whether a pace of the flip is consistent. For example, responsive to determining that time to flip Ft, time to pause Pt, time to retract Rt, time to flip the first half of the page FHPt, and time to flip the second half of the page SHPt are each within a corresponding predetermined range, the content processing system 106 determines that the pace of the flip is consistent. Responsive to determining that the pace of the flip is inconsistent, the content processing system 106 determines 840 that the user operation is "inconsistent pacing of flipping."

Responsive to determining that the pace of the flip is consistent, the content processing system 106 compares 850 time to flip Ft with a sum of time to pause Pt and time to retract Rt. Generally, time to flip Ft is equal to the sum of the time to pause Pt and time to retract Rt, when the user flips through pages when it is uncertain whether the user encounters preferred. Hence, the content processing system 106 determines 860 that the user operation is "Active Slowdown or Pausing Between Flips," responsive to determining that the sum of time to pause Pt and the time to retract Rt is larger than time to flip Ft. Responsive to determining that the time to flip Ft is equal to or larger than the sum of the time to pause Pt and the time to retract Rt, the content processing system 106 compares 870 FHPt with SHPt. Responsive to determining that FHPT is larger than SHPt, the content processing system 106 determines 880 that the user operation is "Active Slowdown or Pausing Within First Half of the Flip." Responsive to determining that the FHPT is equal to or less than SHPt, the content processing system 106 determines 890 that the user operation is "consistently flipping" or flipping in a way that does not demonstrate intentional user interaction or preference for content.

According to the defined user interaction with content items presented, user preference for content items can be determined. In one aspect, "change in navigational direction," "inconsistent pacing of flipping," "active slow down or pausing," "extend first half of page flip time" indicate the user encountered content items preferred by users. As described above with respect to FIG. 5, corresponding processes (e.g., statistical analysis) can be performed for each user interaction to determine user preference for content items and to predict preferred content items to the user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer readable medium (e.g., non-transitory computer readable medium) containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A computer-implemented method performed by a computer system for presenting content items in a digital magazine, the method comprising:
obtaining information from a client device describing attributes of a first user flipping a page of the digital magazine, the page including one or more content items, the attributes of the first user flipping the page including a direction of the flipping, a time to flip, a time to pause in between flips, a time to retract for a next flip, a first time to flip a first half of the page, and a second time to flip a second half of the page;
determining a sum of (i) the time to pause and (ii) the time to retract;
determining a user preference for the content items or topics by comparing the time to flip to the sum of (i) the time to pause and (ii) the time to retract;
predicting preferred content items of a second user based on the user preference for the content items or the topics associated with content items; and
generating page information describing another page including one or more of the predicted preferred content items, the other page presented according to the page information.

2. The method of claim 1, wherein the information describing the attributes of the first user flipping the page is provided by a client device operable by the first user, the client device different from the computer system.

3. The method of claim 1, further comprising:
transmitting the page to a client device operated by the second user.

4. The method of claim 1, wherein determining the user preference for the content items or topics by comparing the time to flip to the sum of (i) the time to pause and (ii) the time to retract comprises:
responsive to the time to flip being less than the sum of (i) the time to pause and (ii) the time to retract, determining that the first user prefers one or more content items presented in the page being flipped.

5. The method of claim 1, wherein determining the user preference for the content items or topics by comparing the time to flip to the sum of (i) the time to pause and (ii) the time to retract comprises:
responsive to the time to flip being less than the sum of (i) the time to pause and (ii) the time to retract, determining that the first user prefers one or more topics associated with the content items presented in the page being flipped.

6. The method of claim 1, wherein determining the user preference for the content items or topics by comparing the time to flip to the sum of (i) the time to pause and (ii) the time to retract comprises:
determining a pace of the flipping based on the time to flip, the time to retract, and the time to pause;
in response to the time to flip being equal to the sum of (i) the time to retract and (ii) the time to pause, the pace of the flipping is determined to be a consistent pace of the flipping, and
in response to the time to flip being different from the sum of (i) the time to retract and (ii) the time to pause, the pace of the flipping is determined to be an inconsistent pace of the flipping.

7. The method of claim 6, wherein determining the user preference for the content items or topics by comparing the time to flip to the sum of (i) the time to pause and (ii) the time to retract further comprises:
responsive to determining that the pace of the flipping being the inconsistent pace, determining that the first user prefers at least one of the one or more content items presented in the page being flipped.

8. The method of claim 6, wherein determining the user preference for the content items or topics by comparing the time to flip to the sum of (i) the time to pause and (ii) the time to retract further comprises:
responsive to determining that the pace of the flipping being the inconsistent pace, determining that the first user prefers one or more topics associated with the content items presented in the page being flipped.

9. The method of claim 1, further comprising:
determining a change in the direction of the flipping.

10. The method of claim 9, further comprising:
responsive to determining the change in the direction of the flipping, determining that the first user prefers at least one or more of the content items presented in the page being flipped.

11. The method of claim 9, further comprising:
responsive to determining the change in the direction of the flipping, determining that the first user prefers at least one or more topics associated with the content items presented in the page being flipped.

12. The method of claim 1 further comprising:
determining the first user increases the first time to flip the first half of the page compared to the second time to flip the second half of the page.

13. The method of claim 1, further comprising:
determining a user interaction with the one or more content items, the user interaction corresponding to the attributes of the first user flipping the page containing the one or more content items,
wherein the user preference for the one or more content items is determined based on the user interaction with the one or more content items.

14. The method of claim 1, wherein the first user is different from the second user.

15. A non-transitory computer-readable storage medium storing executable computer program instructions for presenting content items in a digital magazine, the computer program instructions when executed by a computer processor cause the computer processor to:
obtain information describing attributes of a first user flipping a page of the digital magazine, the page including one or more content items, the attributes of the first user flipping the page including a direction of the flipping, a time to flip, a time to pause in between flips, a time to retract for a next flip, a first time to flip a first half of the page, and a second time to flip a second half of the page;
determining a sum of (i) the time to pause and (ii) the time to retract;
determine a user preference for the content items or topics by comparing the time to flip to the sum of (i) the time to pause and (ii) the time to retract;
predict preferred content items of a second user based on the user preference for the content items or the topics associated with content items; and
generate page information describing another page including one or more of the predicted preferred content items, the other page presented according to the page information.

16. The non-transitory computer-readable storage medium of claim 15, wherein the information describing the attributes of the first user flipping the page is provided by a client device operable by the first user.

17. The non-transitory computer-readable storage medium of claim 15, wherein the computer program instructions when executed by the computer processor further cause the computer processor to:
transmit the page to a client device operated by the second user.

18. The non-transitory computer-readable storage medium of claim 15, wherein the first user is different from the second user.

* * * * *

UNITED STATES PATENT AND TRADEMARK OFFICE
CERTIFICATE OF CORRECTION

PATENT NO. : 10,410,239 B2  
APPLICATION NO. : 15/482645  
DATED : September 10, 2019  
INVENTOR(S) : David Wigder et al.

Page 1 of 1

It is certified that error appears in the above-identified patent and that said Letters Patent is hereby corrected as shown below:

In the Claims

In Column 19, Claim 12, Line 1, delete "The method of claim 1" and insert -- The method of claim 1, --

Signed and Sealed this  
Fourteenth Day of April, 2020

Andrei Iancu  
*Director of the United States Patent and Trademark Office*